United States Patent [19]
Legouis et al.

[11] Patent Number: 5,213,184
[45] Date of Patent: May 25, 1993

[54] DEVICE FOR COMPENSATING A VIBRATIONAL FORCE OR TORQUE ACTING ON A BODY

[75] Inventors: Thierry Legouis, Basse Goulaine; Philippe de Larminat, Rennes; Michel Guglielmi, Nantes, all of France

[73] Assignee: ACB, Paris, France

[21] Appl. No.: 858,583

[22] Filed: Mar. 27, 1992

[30] Foreign Application Priority Data

Mar. 28, 1991 [FR] France ............................ 91 03771

[51] Int. Cl.$^5$ .............................................. F16F 7/10
[52] U.S. Cl. .................................................... 188/378
[58] Field of Search ................ 267/182; 188/378, 379, 188/382

[56] References Cited
FOREIGN PATENT DOCUMENTS
0337040 10/1989 European Pat. Off. .

Primary Examiner—Robert J. Oberleitner
Assistant Examiner—Lee W. Young
Attorney, Agent, or Firm—Sughrue, Mion, Zinn, Macpeak & Seas

[57] ABSTRACT

A device for compensating a vibration force uses four rotating weights with parallel rotation axes. The four weights are located in a common plane P and symmetrical in pairs relative to a plane perpendicular to the plane P and passing through the line of action of the vibrational force F to be compensated. The weights of each pair rotate in opposite directions. A device for compensating a vibrational torque uses four rotating weights with rotation axes parallel to an axis D and symmetrical in pairs relative to the axis D. The weights of each pair rotate in the same direction. A real time control device includes a constant gain non-linear self-adapting Kalman filter.

2 Claims, 3 Drawing Sheets

DEVICE FOR COMPENSATING A VIBRATIONAL FORCE OR TORQUE ACTING ON A BODY

BACKGROUND OF THE INVENTION

1. Field of the Invention

The document EP-A-0337040 published Oct. 18, 1989 discloses a device for compensating a vibrational force F generated by a body. The device comprises four eccentric rotating weights located in a common plane P containing the centre of gravity of said vibrating body. Each weight is driven by an electric motor. The rotation axes of the weights are parallel to each other, perpendicular to the plane P and fixed with respect to said body. The four weights comprise a first pair of contra-rotating weights whose rotation axes are symmetrical relative to a plane $P_1$ containing the centre of gravity of said vibrating body and perpendicular to the plane P and a second pair of contrarotating weights whose rotation axes are symmetrical relative to said plane $P_1$. The four weights rotate at the same angular frequency $\omega$. The weights of the first pair each generate a rotating force $F_1$ located in the plane P and comprising a sinusoidal unwanted first component about an axis perpendicular to the plane $P_1$ and a sinusoidal wanted second component about the axis $\Delta$ defined by the intersection of the planes P and $P_1$ coincident with the line of application of the force F. The unwanted components of the rotating forces of said first pair compensate each other out and the wanted components are in phase and of the same amplitude. The weights of the second pair also generate two rotating forces located in said plane P and each having a sinusoidal unwanted first component about an axis perpendicular to the plane $P_1$ and a sinusoidal wanted second component about said axis $\Delta$. The unwanted components of the rotating forces of said second pair compensate each other out and the wanted components are in phase with each other and of the same amplitude and phase-shifted by an angle $2\theta$ relative to the wanted components of the rotating forces of the first pair. At least one accelerometer on each pair is connected to a real time computer adapted to calculate estimated values of the frequency, amplitude, phase and any variation in frequency by means of a non-linear self-adapting filter and to control the four motors by means of signals produced by angular encoders disposed on each of said motors.

The same document discloses a device for compensating a vibrational torque generated by a body. The device comprises four eccentric rotating weights rotating at the same angular frequency $\omega$, each weight being driven by an electric motor. The rotation axes of the weights are parallel to the moment vector of the vibrational torque to be compensated and fixed with respect to said body. The four weights comprise a first pair of weights rotating in the same direction in a common plane $P_2$ and whose rotation axes are symmetrical relative to an axis D perpendicular to the plane $P_2$ and a second pair of weights rotating in the same direction in a common plane $P_3$ parallel to or coincident with the plane $P_2$ and whose rotation axes are symmetrical relative to the axis D. The weights of the first pair generate two rotating forces $F_2$ located in the plane $P_2$ constituting a first torque whose moment vector is parallel to the axis D and whose modulus is sinusoidal. The weights of the second pair also generate rotating forces $F_2$ located in the plane $P_3$ constituting a second torque whose moment vector is parallel to the axis D and whose modulus is sinusoidal. The moduli of the first and second torques are out of phase with each other by an angle $2\theta_1$. At least one accelerometer on each pair is connected to a real time computer adapted to compute estimated values of the frequency, amplitude, phase and any variation in frequency by means of a self-adapting filter and to control the four motors using signals from angular encoders disposed on each of said motors.

In both devices, i.e. that for compensating a vibrational force F and that for compensating a vibrational torque, the self-adapting filter used in the real time computer is a Kalman filter which calculates estimated parameters of the excitation signal to be eliminated from the resultant residual signal $\epsilon(t)$.

The residual signal $\epsilon(t)$ is derived in a computer from acceleration signals $\gamma_1$ and $\gamma_2$ from the accelerometers.

The residual signal $\epsilon(t)$ is a signal of very low amplitude which can cause random operation of the system.

Given the form of the Kalman filter equations, the longer the time elapsed the less able is the filter to adapt to any changes in the excitation signal parameters.

An objet of the invention is to alleviate these drawbacks.

SUMMARY OF THE INVENTION

In one aspect, the present invention consists in a device for compensating a vibrational force F generated by a body, the device comprising four eccentric rotating weights located in a common plane P containing the centre of gravity of said vibrating body, each weight being driven by an electric motor, the rotation axes of the weights being parallel to each other, perpendicular to the plane P and fixed with respect to said body, the four weights comprising a first pair of contrarotating weights whose rotation axes are symmetrical relative to a plane $P_1$ containing the centre of gravity of said vibrating body and perpendicular to the plane P and a second pair of contrarotating weights whose rotation axes are symmetrical relative to said plane $P_1$, the four weights rotating at the same angular frequency $\omega$, the weights of the first pair each generating a rotating force $F_1$ located in the plane P and comprising a sinusoidal unwanted first component about an axis perpendicular to the plane $P_1$ and a sinusoidal wanted second component about the axis $\Delta$ defined by the intersection of the planes P and $P_1$ coincident with the line of application of the force F, the unwanted components of the rotating forces of said first pair compensating each other out and the wanted components being in phase and of the same amplitude, the weights of the second pair also generating two rotating forces located in said plane P and each having a sinusoidal unwanted first component about an axis perpendicular to the plane $P_1$ and a sinusoidal wanted second component about said axis $\Delta$, the unwanted components of the rotating forces of said second pair compensating each other out and the wanted components being in phase with each other and of the same amplitude and phase-shifted by an angle $2\theta$ relative to the wanted components of the rotating forces of the first pair, at least one accelerometer on each pair being connected to a real time computer adapted to calculate estimated values of the frequency, amplitude, phase and any variation in frequency by means of a non-linear self-adapting filter and to control the four motors by means of signals produced by angular encoders disposed on each of said motors, in which device said self-adapting filter receives at its input a signal which reconstitutes the signal F to be compensated obtained by summing the residual signal $\epsilon(t)$ and the image signal $\hat{F}_a$ representing the resultant force generated by the weights, said signal $\hat{F}_a$ is derived from signals from said angular encoders and said non-linear self-adapting filter is a constant gain Kalman filter.

In a second aspect, the present invention consists in a device for compensating a vibrational torque generated by a body, the device comprising four eccentric rotating weights rotating at the same angular frequency $\omega$, each weight being driven by an electric motor, the rotation axes of the weights being parallel to the moment vector of the vibrational torque to be compensated and being fixed with respect to said body, the four weights comprising a first pair of weights rotating in the same direction in a common plane $P_2$ and whose rotation axes are symmetrical relative to an axis D perpendicular to the plane $P_2$ and a second pair of weights rotating in the same direction in a common plane $P_3$ parallel to or coincident with the plane $P_2$ and whose rotation axes are symmetrical relative to the axis D, the weights of the first pair generating two rotating forces $F_2$ located in the plane $P_2$ constituting a first torque whose moment vector is parallel to the axis D and whose modulus is sinusoidal, the weights of the second pair also generating rotating forces $F_2$ located in the plane $P_3$ constituting a second torque whose moment vector is parallel to the axis D and whose modulus is sinusoidal, the moduli of the first and second torques being out of phase with each other by an angle $2\theta_1$, at least one accelerometer on each pair being connected to a real time computer adapted to compute estimated values of the frequency, amplitude, phase and any variation in frequency by means of a self-adapting filter and to control the four motors using signals from angular encoders disposed on each of said motors, in which device said self-adapting filter receives on an input a signal which reconstitutes the signal C to be compensated obtained by summing the residual signal $\epsilon(t)$ and the image signal $\hat{C}_a$ representing the resultant torque generated by said weights, said signal $\hat{C}_a$ is derived from signals from said angular encoders and said non-linear self-adapting filter is a constant gain Kalman filter.

The invention will now be described with reference to the appended drawings.

DETAILED DESCRIPTION OF THE INVENTION

Figure 1:
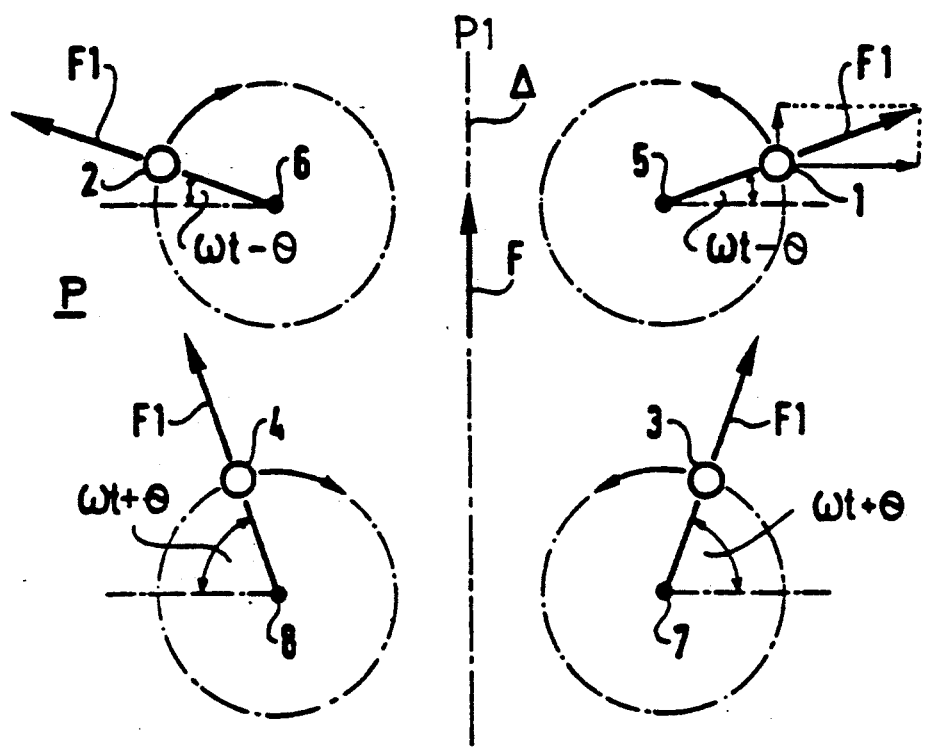
FIG. 1 is a diagrammatic representation of a device in accordance with the invention for compensating a vibrational force.

Referring to FIG. 1, a body is acted on by vibrational force of modulus F and frequency $\omega/2\pi$ about an axis $\Delta$. A compensator device comprises four identical eccentric rotating weights 1, 2, 3 and 4 each driven by an electric motor.

The weight rotation axes are parallel to each other and fixed with respect to the vibrating body. The rotation axes 5–6 of the first pair of weights 1 and 2 are symmetrical to each other with respect to a plane $P_1$ passing through the axis $\Delta$ and perpendicular to the plane P in which the weights rotate. The weights 1 and 2 of the first pair rotate in opposite directions at the same angular frequency $\omega$ and symmetrically with respect to the plane $P_1$ and therefore generate two equal rotating forces $F_1$ whose lines of action intersect on the axis $\Delta$ and which have sinusoidal unwanted components which compensate each other out of value $F_1 \cos(\omega t - \theta)$ and $-F_1 \cos(\omega t - \theta)$ about an axis perpendicular to the axis $\Delta$ and two sinusoidal wanted components about the axis $\Delta$ of the same value $F_1 \sin(\omega t - \theta)$ so producing a resultant force along the axis $\Delta$ whose value is equal to $2 F_1 \sin(\omega t - \theta)$.

Similarly, the rotation axes 7 and 8 of the second pair of weights 3 and 4 are symmetrical to each other with respect to the plane $P_1$ passing through $\Delta$ and perpendicular to the plane P. The weights 3 and 4 also rotate in opposite directions at the same angular frequency $\omega$ but out of phase by an angle $2\theta$ relative to the weights 1 and 2 of the first pair. These weights also generate two rotating forces $F_1$ comprising as previously two unwanted components perpendicular to the plane P which compensate each other out and two wanted components about the axis $\Delta$ of the same value $F_1 \sin(\omega t + \theta)$ producing a resultant force on the axis $\Delta$ equal to $2 F_1 \sin(\omega t + \theta)$.

Two forces are produced along the axis $\Delta$, one generated by the first pair of weights and having the value $2 F_1 \sin(\omega t - \theta)$ and the other generated by the second pair of weights and having the value $2 F_1 \sin(\omega t + \theta)$. The resultant of these two forces is a force equal to: $4 F_1 \sin \omega t \cos \theta$. By respecting the condition $F = 4 F_1 \cos \theta$, or $\cos \theta = F/4 m \omega^2 r$, where m and r are the mass of each weight and its eccentricity, the device compensates out exactly the unwanted vibrational force F at the frequency $\omega/2\pi$.

In practise each weight may be a homogeneous disk or link carrying an unbalanced mass. This member may, for example, be mounted directly on the output shaft of the drive motor through the intermediary of a flexible coupling.

Figure 3:
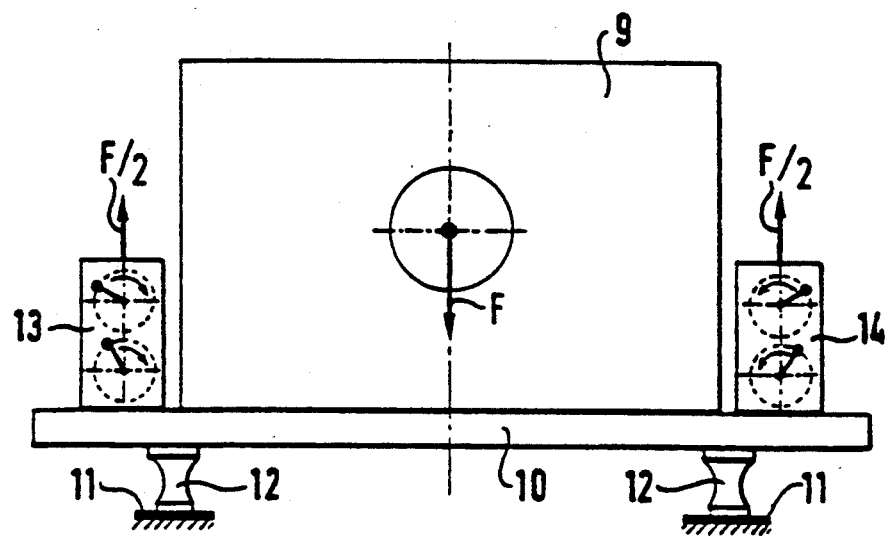
FIG. 3 shows one example of mounting a force compensator.
Figure 4:
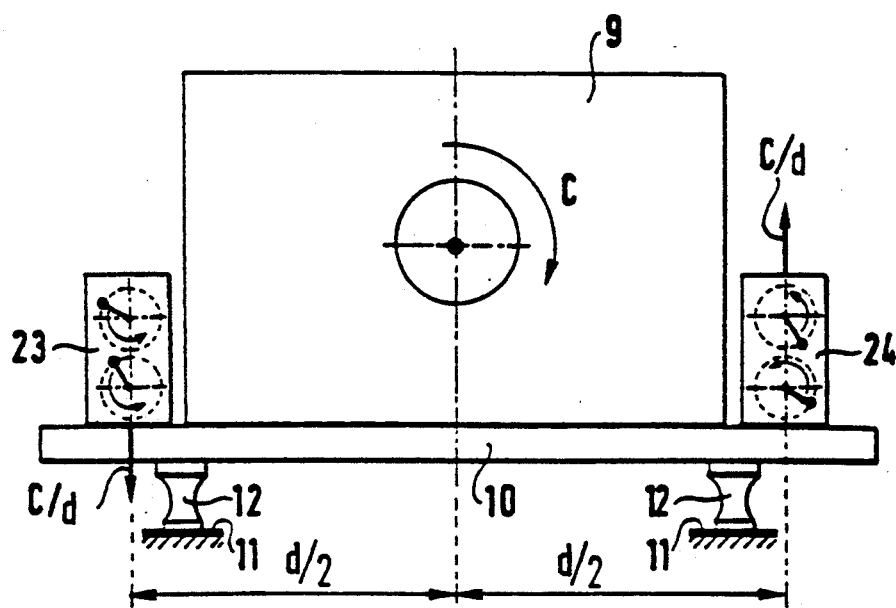
FIG. 4 shows one example of mounting a torque compensator.

FIGS. 3 and 4 show the use of the device in the case of a machine 9 generating a vibrational force or torque resting on a base 10 which itself rests on the ground 11 through supports 12.

The weights 2 and 4 are disposed inside a box 13 which also contains the drive motors and the weights 1 and 3 are placed inside a box 14 which also contains the drive motors. The boxes are disposed symmetrically relative to the force F to be compensated. They are fixed to the base 10 and each contains an accelerometer producing signals enabling a control device shown in FIG. 5 and described later to control the speed of the motors and vary the phase angle $\theta$.

FIG. 1 shows the axes 5 and 6 the same distance apart as the axes 7 and 8 but this spacing could be different.

Figure 2:
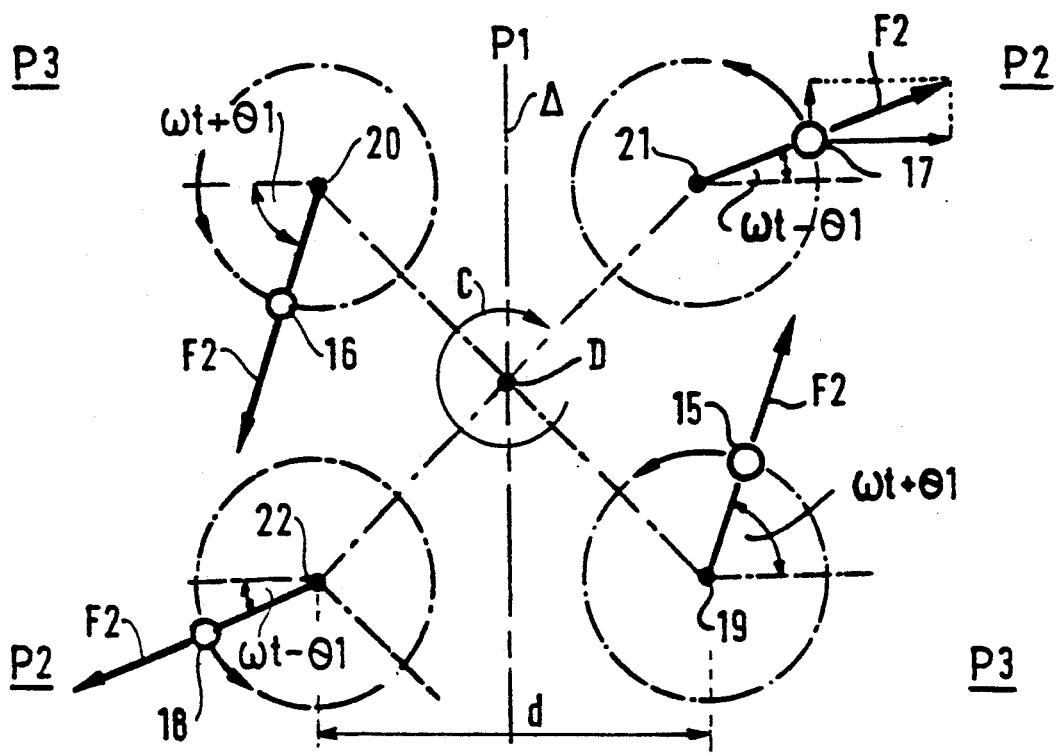
FIG. 2 is a diagrammatic representation of a device in accordance with the invention for compensating a vibrational torque.

FIG. 2 shows a device for compensating a torque of modulus C and frequency $\omega/2\pi$.

It also comprises four eccentric weights 15, 16, 17 and 18 rotating at the same angular frequency $\omega$ and each rotated by a respective electric motor about respective rotation axes 19, 20, 21 and 22 fixed with respect to the body on which the vibrational torque to be compensated acts.

The four axes 19, 20, 21 and 22 are parallel to the moment vector of the torque to be compensated.

The weights 15 and 16 form a first pair. The weights of this first pair rotate in the same direction in a common plane $P_2$, the rotation axes 19 and 20 being symmetrical with respect to an axis D perpendicular to the plane $P_2$ and parallel to the moment vector of the vibrational torque to be compensated.

As they rotate these weights generate equal centrifugal forces $F_2$ generating a first torque $C_1$ whose moment vector is parallel to the axis D and whose modulus is sinusoidal.

Likewise, the weights 17 and 18 form a second pair. The weights of this second pair rotate in the same direction, which is also the rotation direction of the weights of the first pair, in a common plane $P_3$ parallel to or coincident with the plane $P_2$. The rotation axes 21 and 22 are also symmetrical with respect to the axis D and the distance d between the axes 19 and 22 is equal to the distance between the axes 20 and 21. Likewise, the weights 17 and 18 are such and are so positioned with respect to each other that they generate two equal centrifugal forces $F_2$ constituting a second torque with the same value as the torque $C_1$ whose moment vector is parallel to the axis D and whose modulus is sinusoidal and out of phase by an angle $2\theta_1$ with the modulus of the moment vector of the first torque. The resultant of these two torques is a torque equal to $2 C_1 \sin \omega t \cos \theta_1$.

As previously, note that by respecting the condition $C = 2 C_1 \cos \theta_1$, in other words $\cos \theta_1 = C/2 m\omega^2 d r$, the device compensates exactly the unwanted vibrational torque C at the frequency $\omega/2\pi$.

As shown in FIG. 4, the weights 16 and 18 are in practise grouped together in a common box 23 with a drive motor and a measurement accelerometer and the weights 15 and 17 are grouped together in a common box 24 with a drive motor and a measurement accelerometer. The boxes 23 and 24 are disposed symmetrically relative to the vertical plane passing through the rotation axis of the motor 9.

The axes of the four weights could instead all be in a common horizontal plane perpendicular to the planes $P_2$ and $P_3$.

Figure 5:
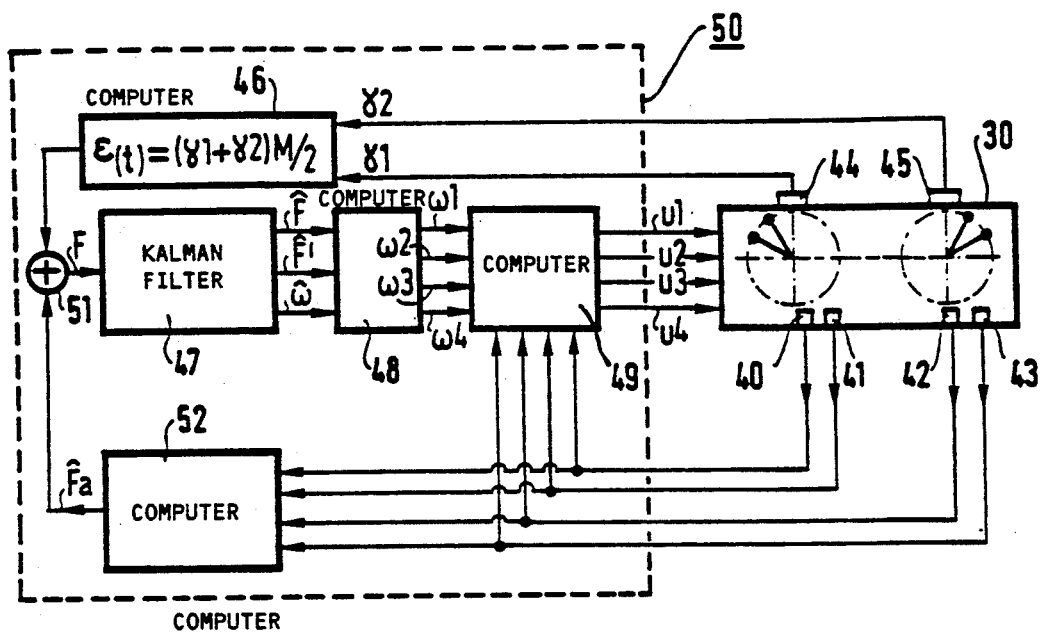
FIG. 5 is a simplified block diagram showing a control device.
Figure 6:
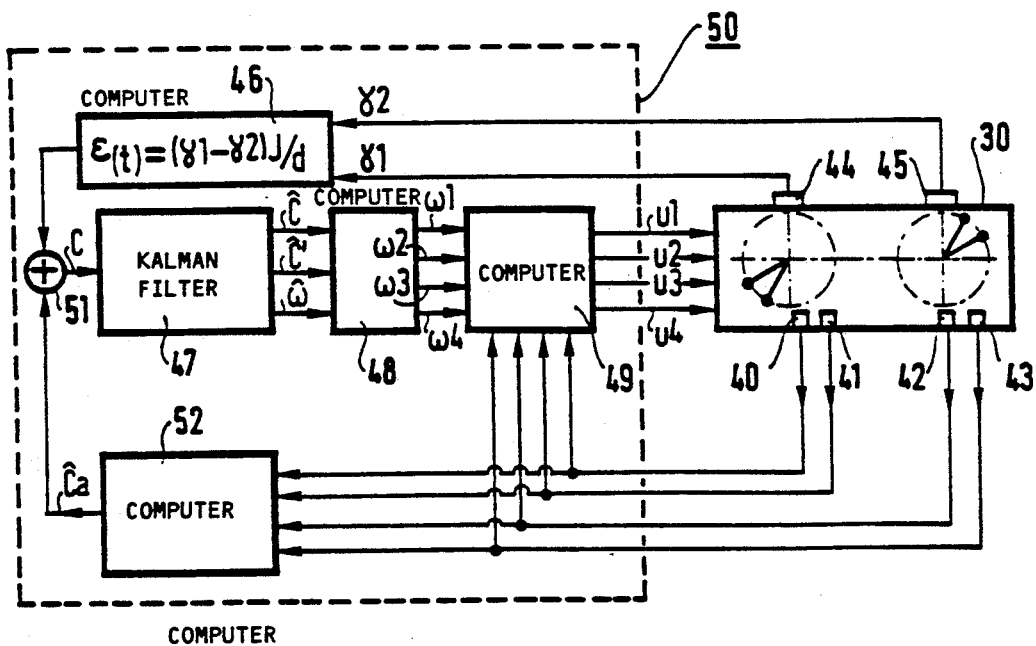
FIG. 6 is a block diagram similar to that of FIG. 5 except that this control device is for compensating a vibrational torque.

FIGS. 5 and 6 are respectively diagrams showing a control device for compensating a force and a control device for compensating a torque. The two control devices are identical in principle and comprise the same components identified by the same reference symbols.

In FIG. 5, showing a control device for compensating a force, a mechanical system consisting of the boxes 13 and 14 from FIG. 3 is symbolically represented by a rectangle 30.

In FIG. 6, showing a control device for compensating a torque, a mechanical system consisting of the boxes 23 and 24 from FIG. 4 is symbolically represented by a rectangle 31.

In both cases each motor is provided with an angular position sensor 40 through 43 and each pair of weights is provided with an accelerometer 44 and 45.

The acceleration signals $\gamma_1$ and $\gamma_2$ from the accelerometers 44 and 45 enable a computer 46 to calculate the residual signal $\epsilon(t)=(\gamma_1+\gamma_2) M/2$ when compensating a vibrational force and $\epsilon(t)=(\gamma_1+\gamma_2) J/d$ when compensating a vibrational torque. In these equations M represents the mass and J the moment of inertia about the rotation axis of the vibrating system.

The signal $\epsilon(t)$ is applied to the input of a summing device 51. The summing device 51 also receives a signal $\hat{F}_a$ from a computer 52 which uses the signals from the angular encoders 40 through 43. This signal represents the resultant force generated by the weights. In FIG. 6, which concerns the compensation of a vibrational torque, the signal $\hat{C}_a$ represents the resultant torque generated by the weights.

The signal F (or C) at the output of the summing device 51 is applied to the input of a non-linear self-adapting filter 47.

The filter 47 is a constant gain Kalman filter defined by the following equations:

For compensating a force:

$$d\hat{F}/dt = -\hat{\omega}\hat{F}' + k_1 (F-\hat{F})$$

$$d\hat{F}'/dt = \hat{\omega}\hat{F}$$

$$d\hat{\omega}/dt = -k_1 k_2 \hat{F}' (F-\hat{F})/(\hat{F}^2+\hat{F}'^2)$$

For compensating a torque:

$$d\hat{C}/dt = -\hat{\omega}\hat{C}' + k_1 (C-\hat{C})$$

$$d\hat{C}'/dt = \hat{\omega}\hat{C}$$

$$d\hat{\omega}/dt = -k_1 k_2 \hat{C}'(C-\hat{C})/(\hat{C}^2+\hat{C}'^2)$$

In the above equations:
$\hat{F}$ is the estimated force F to be compensated,
$\hat{\omega}$ is the estimated angular frequency in radians/s of the force to be compensated,
$\hat{F}'$ is an imaginary force with the same modulus as the force F but in phase quadrature thereto,
$k_1$ and $k_2$ are system constants.

For a torque, $\hat{C}$ is the estimated torque C to be compensated and $\hat{C}'$ is an imaginary torque of the same modulus of the torque C and in phase quadrature thereto.

At the output of the filter 47 there are obtained the variables: $\hat{F}$, $\hat{F}'$ and $\hat{\omega}$ for a force (FIG. 5) and $\hat{C}$, $\hat{C}'$ and $\hat{\omega}$ for a torque (FIG. 6). These variables are then routed to a computer 48 in order to deduce therefrom the value of $\theta$ (or $\theta_1$) needed to generate a force (or torque) whose amplitude is equal to the modulus f of F or c of C.

In the case of a force:

$$\theta = \cos^{-1} (f/4 m r\hat{\omega}^2)$$

In the case of a torque:

$$\theta_1 = \cos^{-1} (C/2 m r d \hat{\omega}^2)$$

The values $\theta$ or $\theta_1$ are then used to compute the four speed set points $\omega_1$, $\omega_2$, $\omega_3$ and $\omega_4$ which are then routed to a computer 49 which generates the four energization voltages $u_1$, $u_2$, $u_3$ and $u_4$ for the respective electric motors of the weights.

The four values $\omega_1$, $\omega_2$, $\omega_3$ and $\omega_4$ are all not very different from $\hat{\omega}$ except for the corrections needed to obtain the calculated phase difference.

Regulation to ensure that the actual speeds of the weights closely match the set point values is obtained by means of a regulator loop which uses the signals from the angular encoders 40 through 43.

As compared with the cited prior art (EP A - 0 337 040), note that the filter input signal never tends towards zero because it is a reconstitution of the excitation signal and not of the residual signal. The filter equations used show that however the excitation parameters vary with time the filter estimates them correctly and therefore ensures correct operation that is not time-dependent.

We claim:

1. Device for compensating a vibrational force F generated by a body, the device comprising four eccentric rotating weights located in a common plane P containing the centre of gravity of said vibrating body, each weight being driven by an electric motor, the rotation axes of the weights being parallel to each other, perpendicular to the plane P and fixed with respect to said body, the four weights comprising a first pair of contrarotating weights whose rotation axes are symmetrical relative to a plane $P_1$ containing the centre of gravity of said vibrating body and perpendicular to the plane P and a second pair of contrarotating weights whose rotation axes are symmetrical relative to said plane $P_1$, the four weights rotating at the same angular frequency $\omega$, the weights of the first pair each generating a rotating force $F_1$ located in the plane P and comprising a sinusoidal unwanted first component about an axis perpendicular to the plane $P_1$ and a sinusoidal wanted second component about the axis $\Delta$ defined by the intersection of the planes P and $P_1$ coincident with the line of application of the force F, the unwanted components of the rotating forces of said first pair compensating each other out and the wanted components being in phase and of the same amplitude, the weights of the second pair also generating two rotating forces located in said plane P and each having a sinusoidal unwanted first component about an axis perpendicular to the plane $P_1$ and a sinusoidal wanted second component about said axis $\Delta$, the unwanted components of the rotating forces of said second pair compensating each other out and the wanted components being in phase with each other and of the same amplitude and phase-shifted by an angle $2\theta$ relative to the wanted components of the rotating forces of the first pair, at least one accelerometer on each pair being connected to a real time computer adapted to calculate estimated values of the frequency, amplitude, phase and any variation in frequency by means of a non-linear self-adapting filter and to control the four motors by means of signals produced by angular encoders disposed on each of said motors, in which device said self-adapting filter receives at its input a signal which reconstitutes a signal (F) to be compensated obtained by summing a residual signal ($\epsilon(t)$) and an image signal ($\hat{F}_a$) representing the resultant force generated by the weights, said image signal ($\hat{F}_a$) is derived from signals from said angular encoders and said non-linear self-adapting filter is a constant gain Kalman filter.

2. Device for compensating a vibrational torque generated by a body, the device comprising four eccentric rotating weights rotating at the same angular frequency $\omega$, each weight being driven by an electric motor, the rotation axes of the weights being parallel to the moment vector of the vibrational torque to be compensated and being fixed with respect to said body, the four weights comprising a first pair of weights rotating in the same direction in a common plane $P_2$ and whose rotation axes are symmetrical relative to an axis D perpendicular to the plane $P_2$ and a second pair of weights rotating in the same direction in a common plane $P_3$ parallel to or coincident with the plane $P_2$ and whose rotation axes are symmetrical relative to the axis D, the weights of the first pair generating two rotating forces $F_2$ located in the plane $P_2$ constituting a first torque whose moment vector is parallel to the axis D and whose modulus is sinusoidal, the weights of the second pair also generating rotating forces $F_2$ located in the plane $P_3$ constituting a second torque whose moment vector is parallel to the axis D and whose modulus is sinusoidal, the moduli of the first and second torques being out of phase with each other by an angle $2\theta_1$, at least one accelerometer on each pair being connected to a real time computer adapted to compute estimated values of the frequency, amplitude, phase and any variation in frequency by means of a self-adapting filter and to control the four motors using signals from angular encoders disposed on each of said motors, in which device said self-adapting filter receives on an input a signal which reconstitutes a signal (C) to be compensated obtained by summing a residual signal ($\epsilon(t)$) and an image signal ($\hat{C}_a$) representing the resultant torque generated by said weights, said image signal ($\hat{C}_a$) is derived from signals from said angular encoders and said non-linear self-adapting filter is a constant gain Kalman filter.

* * * * *